United States Patent [19]

Brown et al.

[11] Patent Number: 4,915,976

[45] Date of Patent: Apr. 10, 1990

[54] PROCEDURE FOR CONTROLLING POWDER FLUIDITY

[75] Inventors: Doris L. Brown; Charles F. Chenot, both of Towanda; Deborah V. Lutz, Troy; Robin W. Munn, Sayre, all of Pa.

[73] Assignee: GTE Products Corporation, Stamford, Conn.

[21] Appl. No.: 279,611

[22] Filed: Dec. 5, 1988

[51] Int. Cl.$^4$ .............................................. B05D 1/22
[52] U.S. Cl. ........................................ 427/8; 427/157; 427/185; 427/213; 427/215
[58] Field of Search ................... 427/8, 213, 185, 157, 427/215

[56] References Cited

U.S. PATENT DOCUMENTS 4,710,674 12/1987 Sigai ...................................... 427/67

Primary Examiner—Shrive Beck
Attorney, Agent, or Firm—Donald R. Castle

[57] ABSTRACT

A process is disclosed for applying a lubricant to a powdered material to control the fluidity of the powdered material. In the process one first obtains at least x number of samples of the powdered material without lubricant. Thereafter, increasing amounts of lubricant are applied to x−1 number of the samples. The bulk and tap densities of the samples are then measured and the Hausner ratio from the densities is calculated. The Hausner ratio versus the concentration of the lubricant in the powder samples is plotted and the concentrations of the minima lubricant in the powder samples at the point of the plot obtained in step e are determined. The concentration of lubricant determined in step f is applied to the remainder of the powdered material whereby an operational level of fluidity of the powder is achieved.

9 Claims, 1 Drawing Sheet

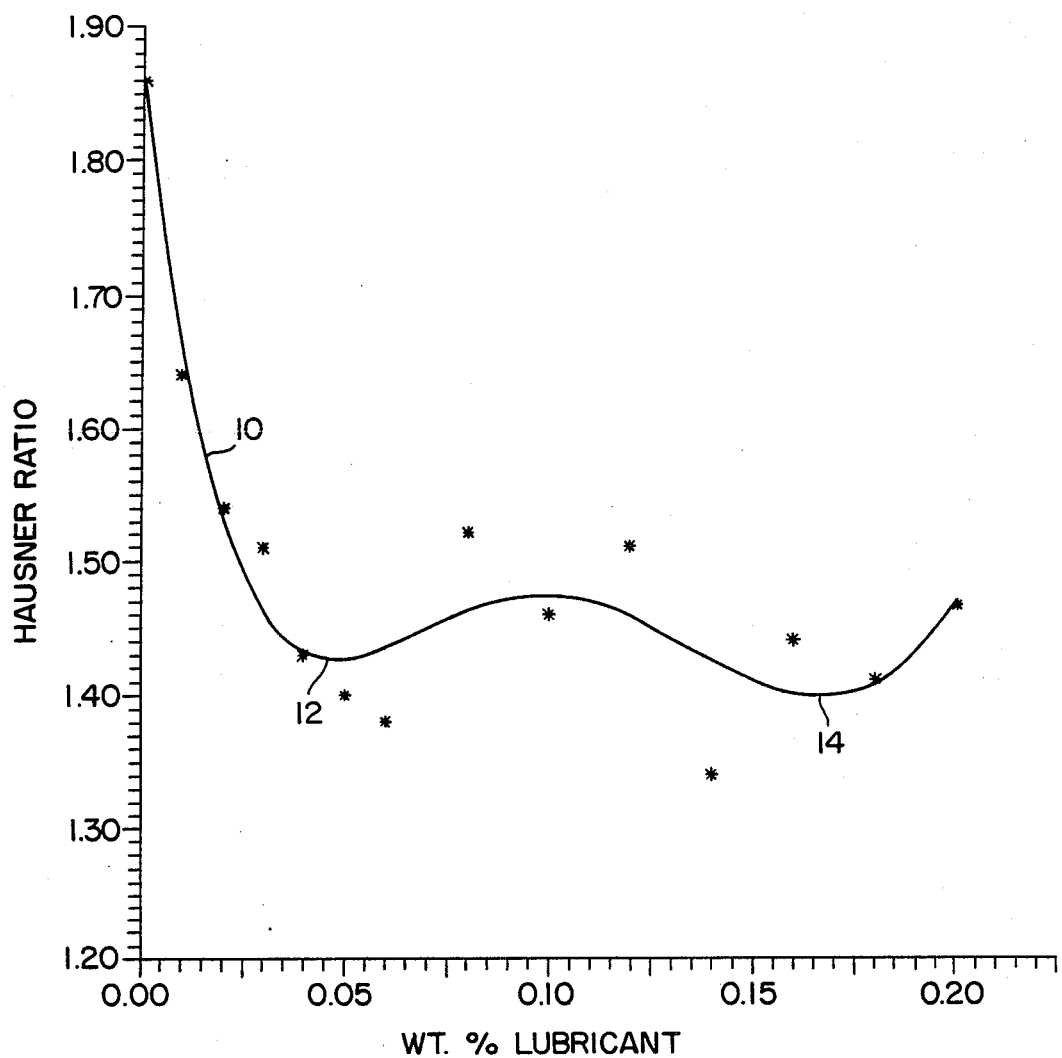

PROCEDURE FOR CONTROLLING POWDER FLUIDITY

FIELD OF THE INVENTION

This invention relates to controlling powder fluidity. More particularly it relates to a process whereby an operational level of fluidity is achieved by applying controlled levels of a lubricant to a powder.

BACKGROUND

Coating of particulate solids or powdered materials in a fluidized bed has been used for many years, particularly in the pharmaceutical industry, however, other industries have utilized this general process including powder metallurgy, ceramics, chemical processing, cosmetics, food and agriculture industries. Relatively little has been published regarding the basic fundamentals of such processes. Thus, during the manufacturing of powdered materials some surface treatment is often desired. For example, the application of a pigment or protective coating may be beneficial. One example of a coating treatment is taught in U.S. Pat. No. 4,710,674, which describes the deposition of a conformal protective coating of $Al_2O_3$ on phosphor particles via a fluid bed-chemical vapor deposition process.

Phosphor particles are usually in the particle size range of from about 3 micrometers to about 20 micrometers and in their untreated state exhibit significant interparticle cohesive forces. Powders such as phosphors are not free flowing and tend to cake and do not fluidize well in a fluid bed operation. Heretofore, lubricants have been added to powders at a fixed level to obtain fluidity, however, it has been discovered that results are sometimes erratic and unpredictable.

It is believed, therefore, that a process for applying a lubricant to a powdered material whereby uniform and operational levels of controlled fluidity are achieved accompanied by relative uniform and desired bulk density characteristics is an advancement in the art.

SUMMARY OF THE INVENTION

In accordance with one aspect of this invention there is provided a process for applying a lubricant to a powdered material, that is to be subsequently processed in a fluid bed, to control the fluidity of the powdered material comprising:

(a) obtaining at least x number of samples of the powdered material without lubricant, (b) applying increasing amounts of lubricant to x-1 number of the samples, (c) measuring the bulk and tap densities of the samples, (d) determining the Hausner ratio from the densities, (e) plotting the Hausner ratio versus the concentration of the lubricant in the powder samples, (f) determining the concentration of the lubricant in the powder samples at the first and second local minima of the plot obtained in step e and (g) providing a concentration of a lubricant in the remainder of the powder within about 0.01% by weight of the concentration of lubricant at the first local minimum if the ratio of cross sectional area, in square millimeters, to the circumference, in millimeters, of the fluid bed to be used is about 20:1 or greater or within about 0.02% by weight of the concentration of lubricant at the second local minimum of the ratio of the cross sectional area in square millimeters to the circumference in millimeters is less than about 20:1, whereby an operational level of fluidity of the powder is achieved.

BRIEF DESCRIPTION OF THE DRAWING

The drawing is a typical plot of the Hausner ratio versus the lubricant concentration for a typical powdered material.

DETAILS OF THE PREFERRED EMBODIMENTS

For a better understanding of this invention, together with other and further objects, advantages and capabilities thereof, reference is made to the following disclosure and appended claims in connection with the foregoing drawing and description of some of the aspects of this invention.

As previously mentioned the coatings of particulate or powder materials in a fluidized bed is known, however, relatively little is known about the basic fundamentals of operation. As a result of the findings of this invention it believed that fluidized bed operations wherein a powder material is being processed to perform either a coating application or a chemical or physical change in the material, such as a chemical reaction or even the removal of a water of hydration from a powder, can utilize the techniques of this invention to achieve a uniform and operational level of controlled fluidity thereby improving the fluidized bed technology. Therefore, the present invention has application to any powdered material that is to be subsequently processed in a fluid bed.

Lubricant materials can be admixed with powders to render them more free flowing or more fluid. In general, any solid film lubricant as identified in Kirk and Othmer's *Encyclopedia of Chemical Technology*, Interscience Publishers, New York, 2nd Edition, Vol 12 that reduces the interparticle attraction in the powder and is otherwise inert with respect to the other properties of the powder can be used in the practice of this invention. Preferred inorganic lubricants include finely divided alumina, finely divided silica, graphite, molydenum disulfide and the like. An especially preferred lubricant is an ultrafine form of alumina, primarily the gamma structure, produced by the flame hydrolysis of anhydrous aluminum chloride, manufactured and sold by Degussa of West Germany. A detailed description of this material, sold under the tradename of Aluminum Oxide C is found in Degussa's Technical Bulletin No. 56, dated May, 1984. The material is described as having essentially all particles having a diameter less than about 20 nanometers and a surface area as measured by BET of from 85 to 115 $m^2/g$. It is also stated that the material is primarily gamma structure with a purity of greater than 99.6%. Small amounts, usually in the range of a few tenths of a weight percent of the foregoing aluminum oxide can render a powder quite free flowing and more suitable for fluid bed processing.

As previously mentioned, it has been discovered during the development of this invention that the results in the processing of powdered materials via fluid beds at fixed levels of lubricants are erratic and unpredictable For example, certain lots of the same material flow too rapidly and other lots flow too slowly. None or too little lubricant can cause inadequate and erratic fluid bed motion accompanied by lumping and channeling. Too much lubricant can cause excessive or over active fluid bed motion and circulation accompanied by excessively high bulk density characteristics.

The present invention discloses the novel and beneficial application of an established measurement procedure identified as the "Hausner ratio" for the purpose of providing a means of altering and controlling the free-flow or fluid characteristics of powdered materials. The Hausner ratio is defined in the *Metals Handbook*, Vol. 7, 9th Ed. p. 285 (1984) as the tap density divided by the bulk density where the densities are in common units of measure. In certain powder processing operations, as for example, the deposition of a protective conformal coating on phosphor particles via a fluid bed operation, a narrow range of preferred fluidity of the powder is required for attainment of desired fluid bed operation and proper processing efficiency. For a given powder material the fluidity is achieved by the admixing of selected lubricant materials, as for example, the foregoing Aluminum Oxide C, that are compatible with the material after processing, for example the lubricant should not interfer with the material used to provide the conformal coating. With increasing amounts of the lubricant material, the powder ranges from the condition of low fluidity to excessive fluidity. The application of the Hausner ratio measurement provides a means of reproducibly and reliably characterizing the powder fluidity for a range of lubricant concentrations and identifying the lubricant concentration necessary for operational powder fluidity for a given powder processing operation.

As previously mentioned, the operation of a fluid bed and the overall fluidity of the powder material within that bed is influenced by the interparticle cohesive forces. In addition, the friction between the particles and the walls of the vessel used to retain the bed effects the overall fluidity of the bed. It has been found that when the ratio of the cross sectional area in square millimeters to the circumference in millimeters of the fluid bed is less than about 20:1, the friction between the wall and the particles, becomes significant and greater amounts of lubricant need to be applied to compensate for the additional frictional force.

For a given powder processing operation the attainment of a specific Hausner ratio value or narrow range around that value, has been determined to assure preferred fluidity for a given powder type, thus compensating for variations in interparticle friction, in particle size and in surface area characteristics of the powder and in some instances the friction between the walls of the bed and the powder.

For the purpose of determining the proper or optimum free-flow property of the powder material, a measurement method was developed to evaluate the free-flow characteristics of a powder material as a function of the lubricant concentration and identify the proper amount of lubricant to be used for a particular powder for optimum and controlled fluid bed operation. This invention provides the application of the Hausner ratio (a measure of the interparticle friction between powder particles) as a tool to enable the control of fluid bed processing of powder materials.

In order to determine the proper amount of lubricant material to admix with a powder material for optimum control of fluidization, the powder material is first subjected to a Hausner anlysis. Basically, this procedure requires x number of small quantities of the powder material to be blended with incrementally greater amounts of lubricant material to yield a group of samples with increasing weight percent of lubricant material. Each sample should be of sufficient quantity to enable both a bulk density measurement and a tap density measurement. The range of lubricant materials in weight % should be broad enough to be sure that significant differences in powder fluidity will be exhibited. However, the interval between weight % increments must also be small enough so that minor changes in fluidity are not missed. The limits for the amount of lubricant material will vary depending on the powder used and the fluid bed application. Factors which affect these limits are powder composition, particle size distribution, and particle morphology. While in theory the value of x can be any value of 3 or greater, as a practical matter for control to be established and the local minima to be accurately determined the value for x should be at least 6. While in theory an infinite number of samples can be utilized it is seldom that more than 16 are necessary and would add unnecessary expense. It is preferred that x range from about 8 to about 15 with from 9 to 14 being especially preferred.

Once the samples have been prepared, the bulk density and tap density of each sample is determined. The actual methods for obtaining these two measurements is not that important. However, it is imperative that the methods be performed exactly the same for each sample. Since both of these measurements tend to be somewhat imprecise, it may be beneficial to repeat the measurements several times for each sample to generate average values.

In dividing the tap density by the bulk density, one can obtain a dimensionless number identified as the Hausner ratio. This calculation should be repeated for each sample. Then this Hausner ratio should be plotted graphically against the weight percent lubricant material. By merely connecting the data points, the result will sometimes be a fairly smooth curve. However, the graph can usually be improved dramatically if curve fitting techniques (e.g. regression analysis) are utilized. Typically, the Hausner ratio decreases rapidly for the initial additions of lubricant material and then gradually tapers off to a minimum and then increases as more lubricant is added then decreases one or more times as more lubricant is added to yield additional local minima. Once a curve is generated, often in the form of a dampened sine wave, the operational weight percent of lubricant material can be determined. This operational weight percent or narrow range of weight percent is dependent on the application and may be at different interpretation points on the curve for the particular application. What has been determined is the fact that for a given fluid bed application the curve interpretation is the same for similar powder type materials (for example phosphors). As a general example of curve interpretation, the Drawing is a plot 10 of Hausner data for a powder sample smoothed by polynomial curve fitting procedure. This curve shows two local minima, 12 and 14, with the first minimum at about 0.05 wt % lubricant which is the proper lubricant level for a fluid bed application wherein the CSA (cross-section-area) to C (circumference) ratio of the bed in > about 20:1; whereas the second local minimum at about 0.16 wt % lubricant is the proper lubricant level for a fluid bed application wherein the CSA to C ratio of the bed is < about 20:1. The overall curve 10 is in the general form of a dampened sine wave. At Point 12 on the curve is the first local minimum, that is, it is the point where the curve no longer continues its downward direction. In this instance, that point corresponds to about 0.05 weight % of lubricant. Thus, if the material is to be subsequently processed in a fluid bed which has a ratio of its cross-sectional area in square millimeters to its circumference in millimeters of about 20:1 or larger, which will be the case for most production scale fluid bed reactors, then the concentration of lubricant is provided from about 0.04% to about 0.06% by weight of the powder. Point 14 on the curve is a second local minimum and it corresponds to about 0.16% by weight of lubricant. Thus, if the material is to be subsequently processed in a fluid bed which has a ratio of its cross sectional area in square millimeters to its circumference in millimeters of about 20:1 or less, which would be the case for laboratory or pilot scale fluid bed reactors, then the concentration of lubricant is provided from about 0.14% by weight of the powder to about 0.18% by weight of the powder.

In order to more fully explain the invention the following detailed examples are presented. All parts, proportion and percentages are by weight unless otherwise specified.

EXAMPLE 1

Fourteen 40-gram samples of a zinc orthosilicate phosphor are prepared with the following weight percents of Degussa Aluminum Oxide C (Alon) admixed to each sample respectively: 0, 0.01, 0.02, 0.03, 0.04, 0.05, 0.06, 0.08, 0.10, 0.12, 0.14, 0.16, 0.18, and 0.20%. The bulk density of each is measured using a Scott Volumeter, described in ASTM B 329 (Metals Handbook p. 274) and the tap density is measured with a Tap-Pak Volumeter (Metals Handbook p. 277) set to 100 taps. The ratio of the tap density to the bulk density or the Hausner ratio is then calculated for each sample. These results are presented in the following table.

| WT % Gamma Al2O3 | Bulk Density Gram/In$^3$ | Tap Density Gram/In$^3$ | Hausner Ratio |
| --- | --- | --- | --- |
| 0 | 9.81 | 22.15 | 2.26 |
| 0.01 | 16.53 | 25.21 | 1.56 |
| 0.02 | 18.21 | 27.31 | 1.50 |
| 0.03 | 18.65 | 28.26 | 1.52 |
| 0.04 | 19.29 | 28.26 | 1.46 |
| 0.05 | 16.14 | 25.61 | 1.59 |
| 0.06 | 17.21 | 25.61 | 1.49 |
| 0.08 | 17.47 | 27.31 | 1.56 |
| 0.10 | 19.54 | 28.26 | 1.45 |
| 0.12 | 20.57 | 28.26 | 1.37 |
| 0.14 | 18.15 | 26.43 | 1.46 |
| 0.16 | 19.16 | 27.31 | 1.43 |
| 0.18 | 19.64 | 27.31 | 1.43 |
| 0.20 | 20.40 | 28.26 | 1.38 |

The ideal weight percent of the lubricant for desired performance in a specific fluidized bed coating application is chosen at the first local minimum of the curve. In this case, a value of about 0.03%. About this concentration is used in the powder mix and the particular fluid bed operation gives a uniform and conformal coating when coated with alumina using a technique as describe in U.S. Pat. No. 4,710,674.

EXAMPLE 2

Fourteen 40gram samples of calcium halophosphate are prepared with the following weight percents of Degussa Aluminum Oxide C admixed to each respectively; 0, 0.02, 0.04, 0.06, 0.08, 0.10, 0.12, 0.14, 0.16, 0.18, 0.20, 0.22, 0.24, and 0.26%.

The bulk density of each sample is measured using a Scott Volumeter and the tap density is measured with a Tap-Pak Volumeter set at 1000 taps. The Hausner ratio is then calculated for each weight percent of the lubricant, gamma alumina oxide having a BET surface area of from about 85 to 115 m$^2$/g. The results are presented in the following table.

| WT % gamma Al2O3 | Bulk Density Gram/In$^3$ | Tap Density Gram/In$^3$ | Hausner Ratio |
| --- | --- | --- | --- |
| 0 | 9.8 | 19.06 | 1.94 |
| 0.02 | 11.4 | 19.06 | 1.67 |
| 0.04 | 12.7 | 20.49 | 1.61 |
| 0.06 | 12.7 | 20.49 | 1.61 |
| 0.08 | 13.7 | 20.74 | 1.51 |
| 0.10 | 13.3 | 20.74 | 1.56 |
| 0.12 | 13.0 | 20.28 | 1.56 |
| 0.14 | 13.4 | 20.49 | 1.53 |
| 0.16 | 12.9 | 20.49 | 1.59 |
| 0.18 | 13.7 | 20.23 | 1.48 |
| 0.20 | 13.4 | 19.99 | 1.49 |
| 0.22 | 13.3 | 19.99 | 1.50 |
| 0.24 | 14.5 | 19.99 | 1.38 |
| 0.26 | 14.0 | 19.99 | 1.43 |

The Hausner ratio is then plotted against the weight percent Alon C. The first local minimum point point is determined and in this instance a level of 0.05% lubricant corresponded to the first local minimum point. The subsequent powder mix is processed in a fluidized bed operation as in Example 1 to achieve a material having a conformal and uniform continuous coating of Al$_2$O$_3$.

While there has been shown what are considered to be the preferred embodiments of this invention, it may be obvious to those skilled in the art that various changes and modifications may be made therein without departing from the scope of the invention as defined by the appended claims.

What is claimed is:

1. A process for applying a lubricant to a powdered material which is to be processed in a fluid bed to control the fluidity of the powdered material said process comprising:
    (a) obtaining at least x number of samples of said powdered material without lubricant,
    (b) applying increasing amounts of lubricant to x−1 number of said samples,
    (c) measuring the bulk and tap densities of the samples,
    (d) determining the Hausner Ratio from the densities,
    (e) plotting the Hausner Ratio versus the concentration of the lubricant in the powder samples,
    (f) determining the concentration of the lubricant in the powder samples at the first and second local minima of the plot obtained in step e and
    (g) providing a concentration of a lubricant in the remainder of the powdered material within about 0.01% by weight of the concentration of the lubricant at the first local minimum if the ratio of the cross sectional area in square millimeters to the circumference in millimeters of the fluid bed to be used is about 20:1 or greater or within about 0.02% less weight of the concentration of lubricant at the second local minimum if the ratio of the cross-sectional area in square millimeters to the circumference in millimeters is less than about 20:1.

2. A process according to claim 1 wherein said powdered material is a phosphor having an average particle size of from about 3 micrometers to about 20 micrometers.

3. A process according to claim 2 wherein said phosphor is zinc orthosilicate.

4. A process according to claim 2 wherein said phosphor is calcium halophosphate.

5. A process according to claim 1 wherein said lubricant is a finely divided gamma alumina.

6. A process according to claim 1 wherein x is a number from 3 to 16.

7. A process according to claim 1 wherein x is a number from 6 to 16.

8. A process according to claim 1 wherein x is a number from 8 to 15.

9. A process according to claim 1 wherein x is a number from 9 to 14.

* * * * *